(12) United States Patent
Peterson et al.

(10) Patent No.: US 11,766,968 B2
(45) Date of Patent: Sep. 26, 2023

(54) VEHICULAR INTERIOR REARVIEW MIRROR ASSEMBLY WITH VIDEO MIRROR DISPLAY AND VRLC STACK

(71) Applicant: Magna Mirrors of America, Inc., Holland, MI (US)

(72) Inventors: Kenneth C. Peterson, Ada, MI (US); Gregory A. Huizen, Hudsonville, MI (US); Gabriele W. Sabatini, Keswick (CA); Traian Miu, Oakville (CA)

(73) Assignee: Magna Mirrors of America, Inc., Holland, MI (US)

( * ) Notice: Subject to any disclaimer, the term of this patent is extended or adjusted under 35 U.S.C. 154(b) by 0 days.

(21) Appl. No.: 17/663,437

(22) Filed: May 16, 2022

(65) Prior Publication Data

US 2022/0371513 A1    Nov. 24, 2022

Related U.S. Application Data

(60) Provisional application No. 63/201,891, filed on May 18, 2021.

(51) Int. Cl.
*B60R 1/26* (2022.01)
*B60R 1/04* (2006.01)
*B60R 1/12* (2006.01)

(52) U.S. Cl.
CPC .................. *B60R 1/26* (2022.01); *B60R 1/04* (2013.01); *B60R 2001/1253* (2013.01); *B60R 2300/103* (2013.01)

(58) Field of Classification Search
CPC ..... B60R 1/26; B60R 1/04; B60R 2001/1253; B60R 2300/103; B60R 1/088; B60R 1/089; B60R 1/12
See application file for complete search history.

(56) References Cited

U.S. PATENT DOCUMENTS

| 5,530,240 A | 6/1996 | Larson et al. |
| 5,550,677 A | 8/1996 | Schofield et al. |
| 5,567,360 A | 10/1996 | Varaprasad et al. |
| 5,570,127 A | 10/1996 | Schmidt |

(Continued)

FOREIGN PATENT DOCUMENTS

| WO | 2022150826 A1 | 7/2022 |
| WO | 2023034956 A1 | 3/2023 |

*Primary Examiner* — Howard D Brown, Jr.
*Assistant Examiner* — Tyler B Edwards
(74) *Attorney, Agent, or Firm* — HONIGMAN LLP

(57) ABSTRACT

A vehicular interior rearview mirror assembly includes a mounting structure and a mirror head pivotally mounted at the mounting structure via a pivot joint. The mirror head includes a mirror casing and a display and mirror assembly, which includes a frame portion, a video display screen at a front side of the frame portion, and a mirror reflective element at a front side of the video mirror display screen. The mirror reflective element includes a variable reflectivity liquid crystal (VRLC) stack of layers, which have a liquid crystal (LC) layer disposed between a rear glass substrate and a front glass substrate. The front and rear glass substrates are integrated in the VRLC stack of layers. With the mounting structure mounted at an interior portion of a vehicle, the video display screen is operable to display video images derived from video images provided by an ECU of the vehicle.

21 Claims, 10 Drawing Sheets

(56) References Cited

U.S. PATENT DOCUMENTS

| | | |
|---|---|---|
| 5,668,663 A | 9/1997 | Varaprasad et al. |
| 5,670,935 A | 9/1997 | Schofield et al. |
| 5,724,187 A | 3/1998 | Varaprasad et al. |
| 5,760,962 A | 6/1998 | Schofield et al. |
| 5,796,094 A | 8/1998 | Schofield et al. |
| 5,877,897 A | 3/1999 | Schofield et al. |
| 6,097,023 A | 8/2000 | Schofield et al. |
| 6,158,655 A | 12/2000 | DeVries, Jr. et al. |
| 6,329,925 B1 | 12/2001 | Skiver et al. |
| 6,483,438 B2 | 11/2002 | DeLine et al. |
| 6,593,565 B2 | 7/2003 | Heslin et al. |
| 6,627,918 B2 | 9/2003 | Getz et al. |
| 6,690,268 B2 | 2/2004 | Schofield et al. |
| 6,703,925 B2 | 3/2004 | Steffel |
| 6,824,281 B2 | 11/2004 | Schofield et al. |
| 7,038,577 B2 | 5/2006 | Pawlicki et al. |
| 7,184,190 B2 | 2/2007 | McCabe et al. |
| 7,195,381 B2 | 3/2007 | Lynam et al. |
| 7,224,324 B2 | 5/2007 | Quist et al. |
| 7,249,860 B2 | 7/2007 | Kulas et al. |
| 7,253,723 B2 | 8/2007 | Lindahl et al. |
| 7,255,451 B2 | 8/2007 | McCabe et al. |
| 7,274,501 B2 | 9/2007 | McCabe et al. |
| 7,289,037 B2 | 10/2007 | Uken et al. |
| 7,338,177 B2 | 3/2008 | Lynam |
| 7,360,932 B2 | 4/2008 | Uken et al. |
| 7,370,983 B2 | 5/2008 | DeWind et al. |
| 7,420,756 B2 | 9/2008 | Lynam |
| 7,446,650 B2 | 11/2008 | Scholfield et al. |
| 7,446,924 B2 | 11/2008 | Schofield et al. |
| 7,477,758 B2 | 1/2009 | Piirainen et al. |
| 7,480,149 B2 | 1/2009 | DeWard et al. |
| 7,581,859 B2 | 9/2009 | Lynam |
| 7,626,749 B2 | 12/2009 | Baur et al. |
| 7,720,580 B2 | 5/2010 | Higgins-Luthman |
| 7,777,611 B2 | 8/2010 | Desai |
| 7,855,755 B2 | 12/2010 | Weller et al. |
| 7,914,187 B2 | 3/2011 | Higgins-Luthman et al. |
| 8,049,640 B2 | 11/2011 | Uken et al. |
| 8,258,932 B2 | 9/2012 | Wahlstrom |
| 8,277,059 B2 | 10/2012 | McCabe et al. |
| 8,446,470 B2 | 5/2013 | Lu et al. |
| 8,451,107 B2 | 5/2013 | Lu et al. |
| 8,508,831 B2 | 8/2013 | De Wind et al. |
| 8,529,108 B2 | 9/2013 | Uken et al. |
| 8,730,553 B2 | 5/2014 | De Wind et al. |
| 8,743,203 B2 | 6/2014 | Karner et al. |
| 8,876,342 B2 | 11/2014 | Wimbert et al. |
| 8,922,422 B2 | 12/2014 | Klar et al. |
| 9,041,806 B2 | 5/2015 | Baur et al. |
| 9,085,261 B2 | 7/2015 | Lu et al. |
| 9,090,213 B2 | 7/2015 | Lawlor et al. |
| 9,126,525 B2 | 9/2015 | Lynam et al. |
| 9,174,578 B2 | 11/2015 | Uken et al. |
| 9,264,672 B2 | 2/2016 | Lynam |
| 9,346,403 B2 | 5/2016 | Uken et al. |
| 9,405,120 B2 | 8/2016 | Graf et al. |
| 9,446,713 B2 | 9/2016 | Lu et al. |
| 9,487,159 B2 | 11/2016 | Achenbach |
| 9,493,122 B2 | 11/2016 | Krebs |
| 9,565,342 B2 | 2/2017 | Sauer et al. |
| 9,598,016 B2 | 3/2017 | Blank et al. |
| 9,609,757 B2 | 3/2017 | Steigerwald |
| 9,827,913 B2 | 11/2017 | De Wind et al. |
| 9,878,669 B2 | 1/2018 | Kendall |
| 9,900,490 B2 | 2/2018 | Ihlenburg et al. |
| 10,017,114 B2 | 7/2018 | Bongwald |
| 10,029,614 B2 | 7/2018 | Larson |
| 10,046,706 B2 | 8/2018 | Larson et al. |
| 10,065,574 B2 | 9/2018 | Tiryaki |
| 10,166,924 B2 | 1/2019 | Baur |
| 10,166,926 B2 | 1/2019 | Krebs et al. |
| 10,261,648 B2 | 4/2019 | Uken et al. |
| 10,264,219 B2 | 4/2019 | Mleczko et al. |
| 10,315,573 B2 | 6/2019 | Bongwald |
| 10,421,404 B2 | 9/2019 | Larson et al. |
| 10,442,360 B2 | 10/2019 | LaCross et al. |
| 10,466,563 B2 | 11/2019 | Kendall et al. |
| 10,484,587 B2 | 11/2019 | Conger |
| 10,567,633 B2 | 2/2020 | Ihlenburg et al. |
| 10,567,705 B2 | 2/2020 | Ziegenspeck et al. |
| 10,703,204 B2 | 7/2020 | Hassan et al. |
| 10,922,563 B2 | 2/2021 | Nix et al. |
| 10,958,830 B2 | 3/2021 | Koravadi |
| 11,167,771 B2 | 11/2021 | Caron et al. |
| 11,205,083 B2 | 12/2021 | Lynam |
| 11,214,199 B2 | 1/2022 | LaCross et al. |
| 11,240,427 B2 | 2/2022 | Koravadi |
| 11,242,008 B2 | 2/2022 | Blank et al. |
| 11,252,376 B2 | 2/2022 | Ihlenburg |
| 11,341,671 B2 | 5/2022 | Lu et al. |
| 11,348,374 B2 | 5/2022 | Kramer et al. |
| 11,433,906 B2 | 9/2022 | Lu |
| 11,465,561 B2 | 10/2022 | Peterson et al. |
| 11,488,399 B2 | 11/2022 | Wacquant |
| 11,493,918 B2 | 11/2022 | Singh |
| 11,518,401 B2 | 12/2022 | Kulkarni |
| 11,582,425 B2 | 2/2023 | Liu |
| 11,639,134 B1 | 5/2023 | Huizen et al. |
| 2002/0005999 A1 | 1/2002 | Hutzel et al. |
| 2006/0050018 A1 | 3/2006 | Hutzel et al. |
| 2007/0182528 A1 | 8/2007 | Breed et al. |
| 2008/0094715 A1 | 4/2008 | Schofield et al. |
| 2008/0231703 A1 | 9/2008 | Nagata et al. |
| 2009/0040778 A1 | 2/2009 | Takayanagi et al. |
| 2010/0085653 A1 | 4/2010 | Uken et al. |
| 2010/0194890 A1* | 8/2010 | Weller .................. B60R 1/10 348/148 |
| 2011/0080481 A1 | 4/2011 | Bellingham |
| 2011/0115615 A1 | 5/2011 | Luo et al. |
| 2011/0273659 A1 | 11/2011 | Sobecki |
| 2014/0022390 A1 | 1/2014 | Blank et al. |
| 2014/0085472 A1 | 3/2014 | Lu et al. |
| 2014/0160276 A1 | 6/2014 | Pliefke et al. |
| 2014/0285666 A1 | 9/2014 | O'Connell et al. |
| 2014/0293169 A1 | 10/2014 | Uken et al. |
| 2014/0313563 A1 | 10/2014 | Uken et al. |
| 2014/0336876 A1 | 11/2014 | Gieseke et al. |
| 2014/0340516 A1 | 11/2014 | Vojtisek et al. |
| 2015/0002670 A1 | 1/2015 | Bajpai |
| 2015/0009010 A1 | 1/2015 | Biemer |
| 2015/0015710 A1 | 1/2015 | Tiryaki |
| 2015/0022664 A1 | 1/2015 | Pflug et al. |
| 2015/0042808 A1 | 2/2015 | Pflug |
| 2015/0092042 A1 | 4/2015 | Fursich |
| 2015/0097955 A1 | 4/2015 | De Wind et al. |
| 2015/0217693 A1 | 8/2015 | Pliefke et al. |
| 2015/0232030 A1 | 8/2015 | Bongwald |
| 2015/0294169 A1 | 10/2015 | Zhou et al. |
| 2015/0296135 A1 | 10/2015 | Wacquant et al. |
| 2015/0352953 A1 | 12/2015 | Koravadi |
| 2016/0009226 A1 | 1/2016 | Krebs |
| 2016/0137126 A1 | 5/2016 | Fursich et al. |
| 2016/0209647 A1 | 7/2016 | Fursich |
| 2016/0375833 A1* | 12/2016 | Larson .................. B60R 1/12 348/148 |
| 2017/0050672 A1 | 2/2017 | Gieseke et al. |
| 2017/0217367 A1 | 8/2017 | Pflug et al. |
| 2017/0217372 A1 | 8/2017 | Lu et al. |
| 2017/0237946 A1 | 8/2017 | Schofield et al. |
| 2017/0254873 A1 | 9/2017 | Koravadi |
| 2017/0274906 A1 | 9/2017 | Hassan et al. |
| 2017/0355312 A1 | 12/2017 | Habibi et al. |
| 2018/0134217 A1 | 5/2018 | Peterson et al. |
| 2018/0215382 A1 | 8/2018 | Gupta et al. |
| 2018/0222414 A1 | 8/2018 | Ihlenburg et al. |
| 2018/0231976 A1 | 8/2018 | Singh |
| 2018/0253608 A1 | 9/2018 | Diessner et al. |
| 2018/0276838 A1 | 9/2018 | Gupta et al. |
| 2018/0276839 A1 | 9/2018 | Diessner et al. |
| 2019/0016264 A1 | 1/2019 | Potnis et al. |
| 2019/0039649 A1 | 2/2019 | Gieseke et al. |
| 2019/0042864 A1 | 2/2019 | Pliefke et al. |
| 2019/0047475 A1 | 2/2019 | Uken et al. |

(56) References Cited

U.S. PATENT DOCUMENTS

| | | |
|---|---|---|
| 2019/0054899 A1 | 2/2019 | Hoyos et al. |
| 2019/0064831 A1 | 2/2019 | Gali et al. |
| 2019/0118717 A1 | 4/2019 | Blank et al. |
| 2019/0118860 A1 | 4/2019 | Gali et al. |
| 2019/0143895 A1 | 5/2019 | Pliefke et al. |
| 2019/0146297 A1 | 5/2019 | Lynam et al. |
| 2019/0168669 A1 | 6/2019 | Lintz et al. |
| 2019/0210615 A1 | 7/2019 | Caron et al. |
| 2019/0258131 A9 | 8/2019 | Lynam et al. |
| 2019/0297233 A1 | 9/2019 | Gali et al. |
| 2019/0347825 A1 | 11/2019 | Gupta et al. |
| 2019/0364199 A1 | 11/2019 | Koravadi |
| 2019/0381938 A1 | 12/2019 | Hopkins |
| 2020/0017143 A1 | 1/2020 | Gali |
| 2020/0143560 A1 | 5/2020 | Lu et al. |
| 2020/0148120 A1 | 5/2020 | Englander et al. |
| 2020/0202151 A1 | 6/2020 | Wacquant |
| 2020/0320320 A1 | 10/2020 | Lynam |
| 2020/0327323 A1 | 10/2020 | Noble |
| 2020/0377022 A1 | 12/2020 | LaCross et al. |
| 2021/0056306 A1 | 2/2021 | Hu et al. |
| 2021/0094473 A1 | 4/2021 | Gali et al. |
| 2021/0122404 A1 | 4/2021 | Lisseman et al. |
| 2021/0155167 A1 | 5/2021 | Lynam et al. |
| 2021/0162926 A1 | 6/2021 | Lu |
| 2021/0245662 A1 | 8/2021 | Blank et al. |
| 2021/0291739 A1 | 9/2021 | Kasarla et al. |
| 2021/0306538 A1 | 9/2021 | Solar |
| 2021/0323473 A1 | 10/2021 | Peterson et al. |
| 2021/0368082 A1 | 11/2021 | Solar |
| 2022/0111857 A1 | 4/2022 | Kulkarni |
| 2022/0242438 A1 | 8/2022 | Sobecki et al. |
| 2022/0254132 A1 | 8/2022 | Rother |
| 2022/0377219 A1 | 11/2022 | Conger et al. |
| 2023/0131471 A1 | 4/2023 | Sobecki et al. |
| 2023/0137004 A1 | 5/2023 | Huizen et al. |

\* cited by examiner

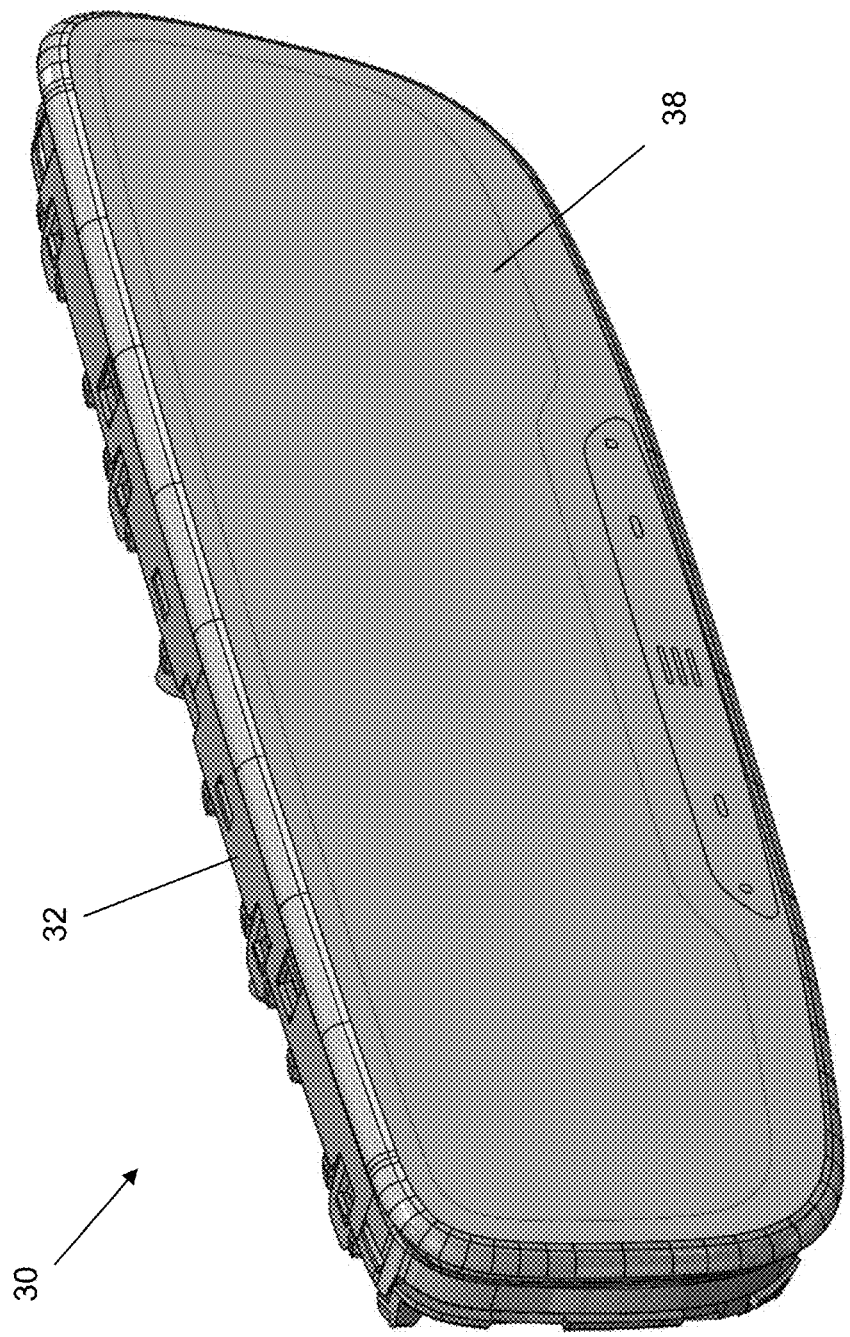

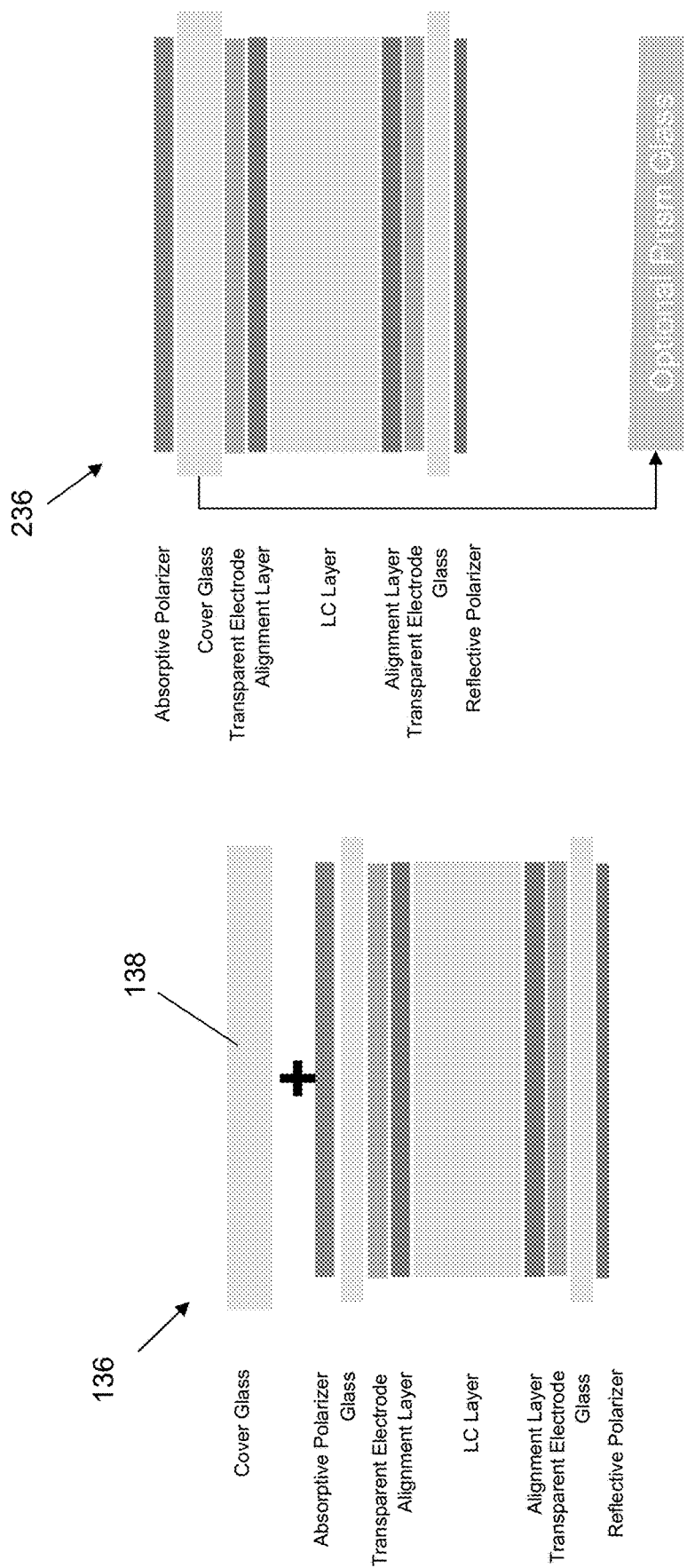

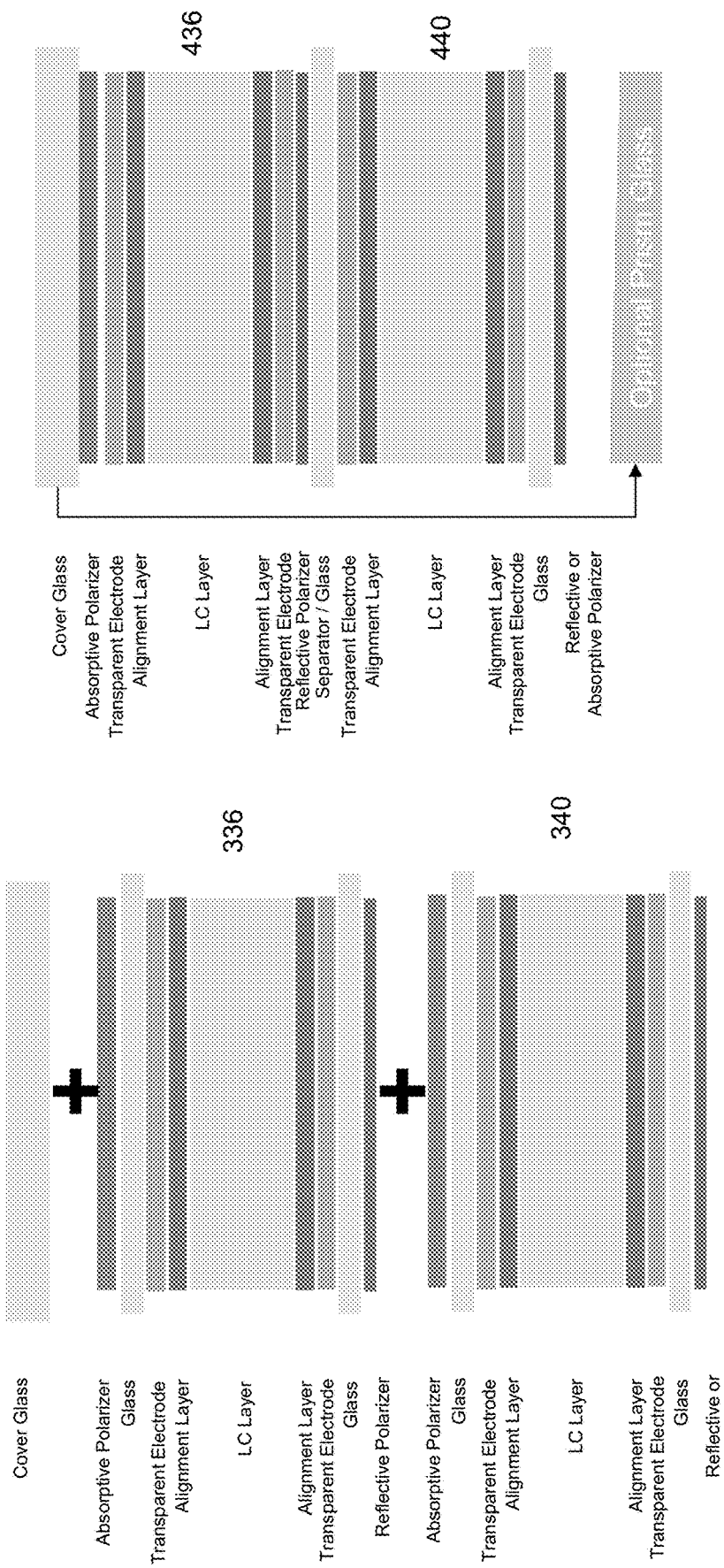

VEHICULAR INTERIOR REARVIEW MIRROR ASSEMBLY WITH VIDEO MIRROR DISPLAY AND VRLC STACK

CROSS REFERENCE TO RELATED APPLICATION

The present application claims the filing benefits of U.S. provisional application Ser. No. 63/201,891, filed May 18, 2021, which is hereby incorporated herein by reference in its entirety.

FIELD OF THE INVENTION

The present invention relates to vehicular interior mirror assemblies and vision systems that display at a video mirror display video images derived from image data captured by one or more cameras of the vehicle.

BACKGROUND OF THE INVENTION

It is known to provide a video display at the exterior rearview mirror assembly, such as described in U.S. Pat. No. 7,777,611, which is hereby incorporated herein by reference in its entirety, or to provide a video display at an interior rearview mirror assembly to display sideward and/or rearward images, such as described in U.S. Pat. No. 5,670,935, which is hereby incorporated herein by reference in its entirety.

SUMMARY OF THE INVENTION

The present invention provides a vehicular vision system that displays video images at a video display screen of an interior rearview mirror assembly for a camera monitoring system, a rear backup camera system, and/or a surround view vision system. The system includes an electronic control unit (ECU) of the vehicle that receives image data captured by one or more cameras, and outputs (such as via a coaxial cable) to the video display of the interior rearview mirror assembly for displaying video images at the display screen based on the driving situation and/or user input by the driver. The video display screen in the interior rearview mirror assembly displays video images that are viewable through the mirror reflective element. The display device includes a stack of layers that reduce or minimize reflections from surfaces and interface changes through the stack. This allows the mirror head to display the video images when in the same orientation as when the driver views rearward via reflections at the mirror reflective element, and thus may eliminate the need for a toggle mechanism or actuator to tilt the mirror head during the video display mode.

These and other objects, advantages, purposes and features of the present invention will become apparent upon review of the following specification in conjunction with the drawings.

BRIEF DESCRIPTION OF THE DRAWINGS

FIG. 3 is a perspective view of a mirror reflective element and display assembly, with an electrochromic glass assembly;

FIG. 6 is a schematic of a variable reflectivity liquid crystal (VRLC) stack of layers for the liquid crystal glass assembly;

FIG. 7 is a schematic of another VRLC stack of layers for the liquid crystal glass assembly, with an integrated cover glass;

FIG. 10 is a schematic of another VRLC stack of layers for the liquid crystal glass assembly and for the liquid crystal display, with an integrated cover glass;

FIG. 11 is a schematic of another VRLC stack of layers for the liquid crystal glass assembly and liquid crystal display, with an integrated cover glass.

DESCRIPTION OF THE PREFERRED EMBODIMENTS

Figure 1:
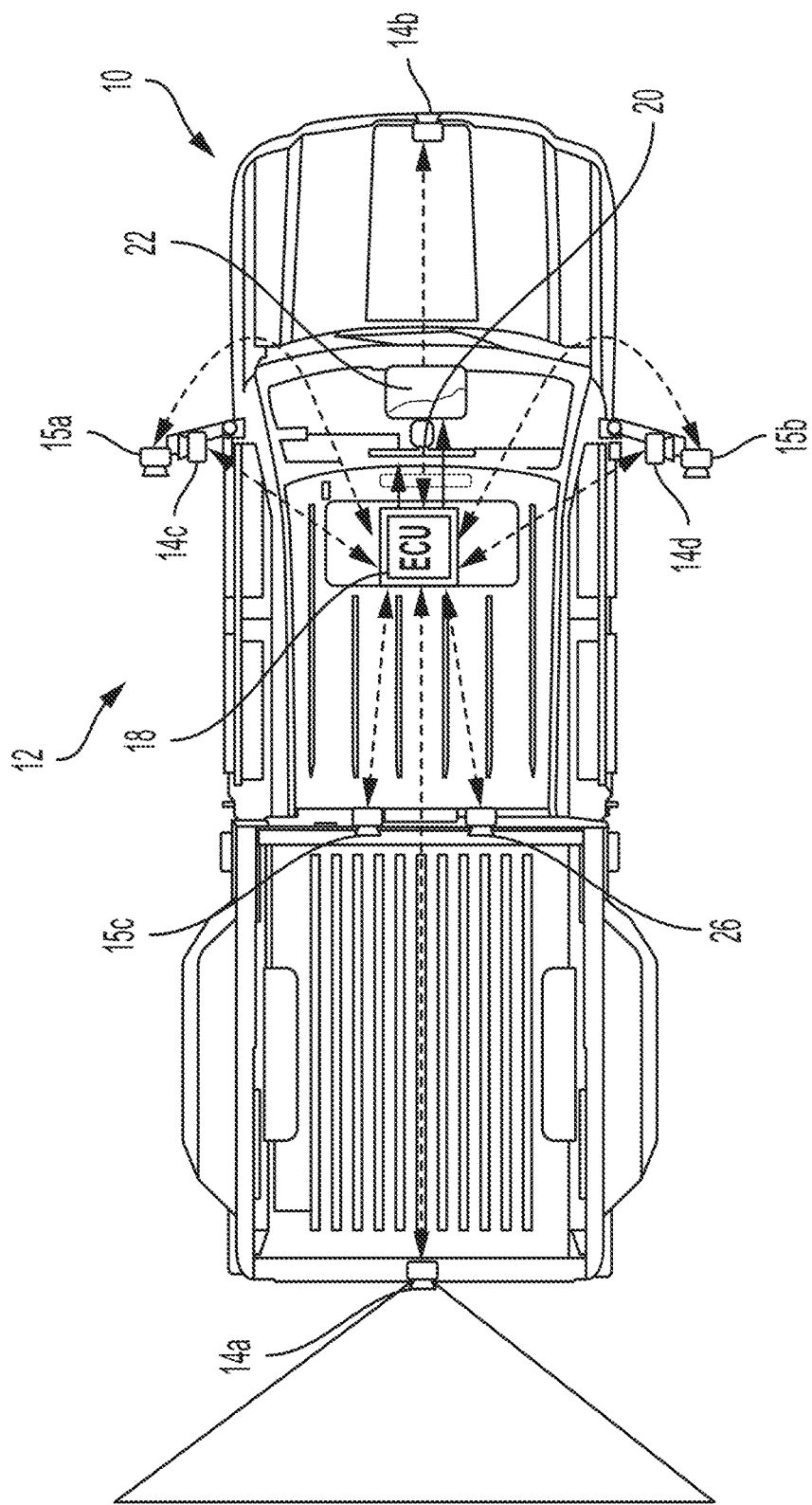
FIG. 1 is a plan view of a vehicle having a vision system in accordance with the present invention.

Referring now to the drawings and the illustrative embodiments depicted therein, a vehicle 10 includes an imaging system or vision system 12 that includes multiple exterior viewing cameras, including, for example, surround view cameras 14a-d (including a rearward viewing or rear backup camera 14a, a forward viewing camera 14b at the front of the vehicle and side surround view cameras 14c, 14d at respective sides of the vehicle), and/or camera monitoring system (CMS) cameras 15a-c (including side rearward viewing CMS cameras 15a, 15b at the respective sides of the vehicle, and a rearward viewing camera 15c that has a different field of view than the rear backup camera 14a), which capture image data of the respective scenes exterior of the vehicle and in the field of view of the respective camera, with each camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The system may utilize aspects of the systems described in U.S. Pat. Nos. 11,242,008; 10,442,360; 10,421,404; 10,166,924 and/or 10,046,706, and/or U.S. Publication Nos. US-2019-0258131; US-2019-0047475; US-2019-0118717 and/or US-2017-0355312, and/or International PCT Application No. PCT/US2022/070062, filed Jan. 6, 2022, which published on Jul. 14, 2022 as International Publication No. WO 2022/150826, which are all hereby incorporated herein by reference in their entireties.

The vision system 12 includes a control or electronic control unit (ECU) 18 having electronic circuitry and associated software, with the electronic circuitry including a data processor or image processor that is operable to process image data captured by the cameras, whereby the ECU may detect or determine presence of objects or the like and/or the system may provide video images or video image data or outputs or signals to a display device of the interior rearview mirror assembly 20 of the vehicle for displaying video images for viewing by the driver of the vehicle and/or to a display device 22 at the center console or stack of the vehicle (and optionally to CMS displays at or near the driver and passenger side A-pillars of the vehicle, such as described in U.S. Publication Nos. US-2018-0134217 and/or US-2014-0285666 and/or International PCT Application No. PCT/US2022/070062, filed Jan. 6, 2022, which published on Jul. 14, 2022 as International Publication No. WO 2022/050826, which are hereby incorporated herein by reference in their entireties). The data transfer or signal communication from the cameras to the ECU may comprise any suitable data or communication link, such as a vehicle network bus or CAN (Controller Area Network) bus or LIN (Local Interconnect Network) bus or I2C bus or the like of the equipped vehicle.

The ECU receives image data captured by each of the cameras and the image data is processed by the data processor or image processor of the ECU. The ECU is connected to the video display of the mirror assembly 20 via a single coaxial wire or cable for communicating with the display (such as to provide control signals or the like) and for providing video image signals to the display. The ECU is also connected to the video display 22 of the center console via a single coaxial wire or cable for communicating with the display and for providing video image signals to the display. Thus, the ECU can provide video image signals or outputs to the center stack display or head unit 22 and/or to the video mirror display 20.

The connections between the cameras and the ECU and/or between the displays and the ECUs may be made via respective coaxial cables, which may provide power and control of the cameras (by the ECU) and which may provide image data from the cameras to the ECU, and which may provide video images or video image data from the ECU to the display devices. Each device (e.g., camera and display device) is thus connected to and communicates with the ECU via a single respective coaxial cable, thus reducing cable inputs to the video mirror display and the center stack display. The connections and communications may utilize aspects of the systems described in U.S. Pat. Nos. 10,264,219; 9,900,490 and/or 9,609,757, which are hereby incorporated herein by reference in their entireties.

The ECU may selectively or episodically provide video image data or signals to the center stack display or head unit 22 and/or the video mirror display 20 based on vehicle speed. For example, at slower speeds (e.g., during a parking or unparking maneuver), video images (such as surround view images or rearview images or the like) are displayed at the center stack display 22 (where it is safe for the driver to look down toward the center stack display when slowly maneuvering the vehicle), and at higher speeds (such as when the vehicle is driven forward along a road), video images (such as rearview images or CMS images or the like) are displayed at the video mirror display 20 (where it is safe for the driver to view without taking his or her eyes off the road when driving the vehicle at higher speeds).

Figure 2A:
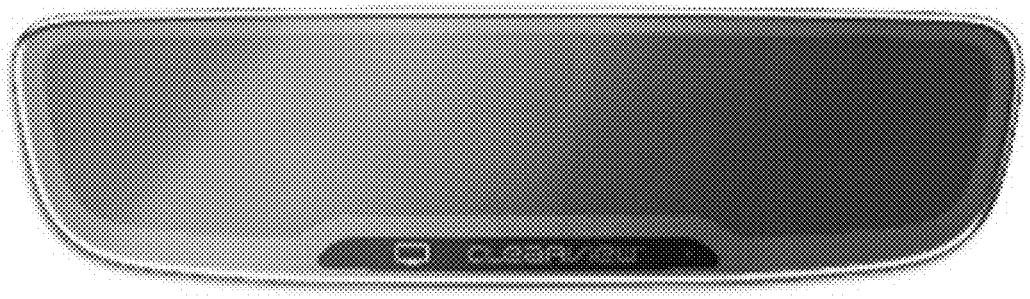
FIGS. 2A and 2B views of an interior rearview mirror assembly, with the mirror functioning in a mirror mode and with the display deactivated (FIG. 2A) and with the mirror functioning in a video display mode with the display activated (FIG. 2B)
Figure 2B:
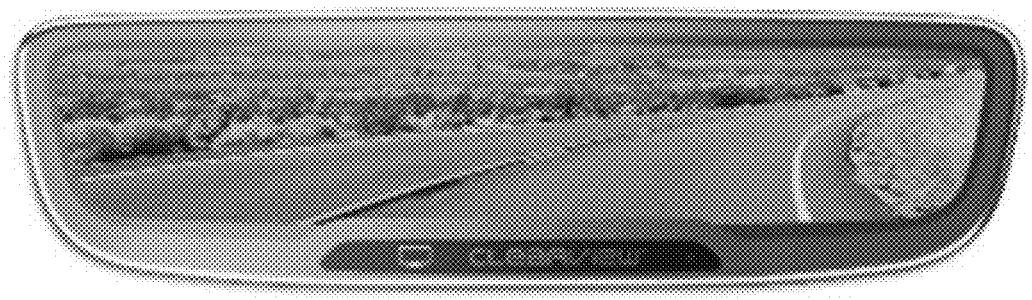

The interior rearview mirror assembly accommodates a video display device disposed behind the mirror reflective element so as to be viewable through a partially reflectant and partially visible light transmitting or transflective mirror reflector of the mirror reflective element when the display screen is powered. For example, and such as shown in FIGS. 2A and 2B, the interior rearview mirror assembly may comprise an auto-dimming electro-optic (such as electrochromic or liquid crystal) mirror assembly that operates as a reflecting mirror (FIG. 2A) when the display screen is off, and functions as a video mirror (FIG. 2B) when the display screen is activated. As discussed below, the display may include a reflective polarizer that replaces the reflective mirror element to provide a video display without a traditional mirror reflective element having a transflective mirror reflector.

The rearward viewing camera 15c of the CMS cameras may also or otherwise function to provide rearward video images for a dual-mode interior rearview video mirror that can switch from a traditional reflection mode to a panoramic live-video display mode, such as is by utilizing aspects of the mirror assemblies and systems described in U.S. Pat. Nos. 10,442,360; 10,421,404; 10,166,924 and/or 10,046,706, and/or U.S. Publication Nos. US-2021-0245662; US-2021-0162926; US-2021-0155167; US-2020-0377022; US-2019-0258131; US-2019-0146297; US-2019-0118717; US-2018-0134217; US-2017-0355312 and/or US-2014-0285666, which are all hereby incorporated herein by reference in their entireties. Thus, when the mirror assembly is set to the video display mode (such as via actuation by the driver of a user-actuatable input), the ECU automatically switches to communicate video images derived from image data captured by the rearward viewing camera 15c to the video display screen at the interior rearview mirror.

Thus, when the mirror assembly is set to the video display mode (such as via actuation by the driver of a user-actuatable input), the ECU automatically switches to communicate video image data derived from image data captured by the rearward-viewing camera 15c to the video display screen at the interior rearview mirror.

Optionally, for a pickup truck application (such as shown in FIG. 1), the system may include a truck bed camera 26 disposed at the rear of the cab of the vehicle and having a field of view that encompasses the truck bed. The ECU communicates with the bed camera 26 and receives image data captured by the truck bed camera 26 and provides video image data (derived from image data captured by the truck bed camera 26) to the center stack display 22, such as responsive to actuation by the driver of a user input in the vehicle.

Figure 4:
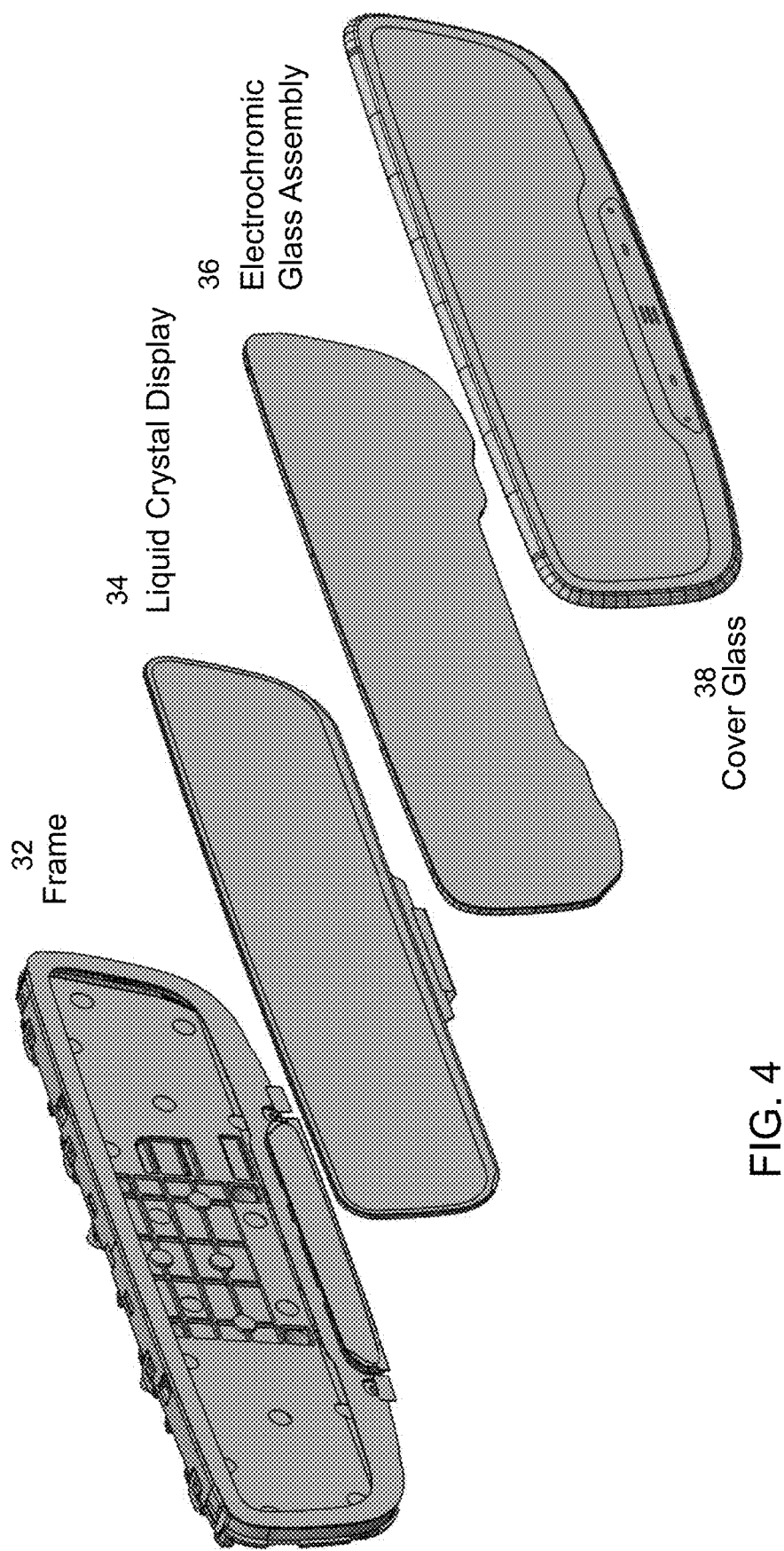
FIG. 4 is an exploded perspective view of the assembly of FIG. 3.

As shown in FIGS. 3 and 4, the mirror head may include a mirror reflective element and display assembly 30, which includes a frame 32, a liquid crystal display 34, a variable reflectivity electrochromic glass assembly 36 and a cover glass 38. Such an electrochromic glass assembly dims or darkens responsive to electrical current applied to electrically conductive coatings or layers disposed at the rear or second surface of the front glass substrate and the front or third surface of the rear glass substrate. The display is disposed behind the reflective element and is viewable through the transflective mirror reflector of the mirror reflective element when the display is activated. The mirror reflective element and display assembly is configured to be attached at a mirror casing (such as via snap attachment) and a pivot element (such as a socket or ball member) may be attached at the mirror casing or at the rear of the frame to pivotally mount the mirror head at another pivot element of a mirror mounting structure (that is attached at an interior portion of the vehicle, such as at the in-cabin side of the windshield or at the header of the vehicle).

Figure 5:
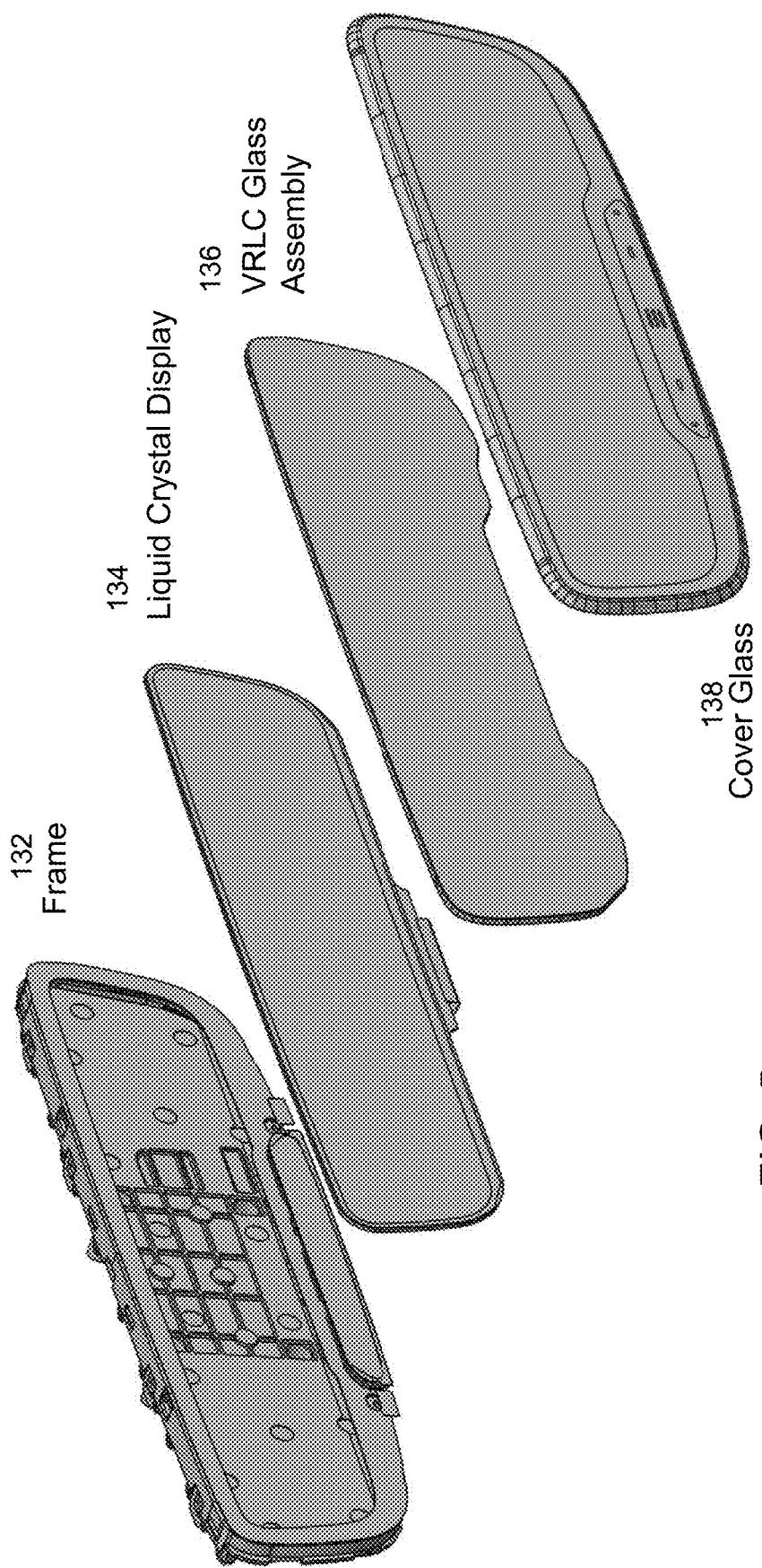
FIG. 5 is an exploded perspective view of a mirror reflective element and display assembly, with a liquid crystal glass assembly.

Optionally, the mirror head may include a mirror reflective element and display assembly 130 (FIG. 5), which includes a frame 132, a liquid crystal display 134, a variable reflectivity liquid crystal (VRLC) glass assembly 136 and a cover glass 138. As shown in FIG. 6, the VRLC glass assembly 136 includes a stack of layers, including an absorptive polarizer at a glass substrate, with an electrode, an alignment layer, a liquid crystal (LC) layer, another alignment layer, and another electrode sandwiched between the glass substrate and another glass substrate, and with a reflective polarizer disposed at the other glass substrate, such as a stack of layers of the types described in U.S. Pat. No. 10,649,264 (assigned to Smart Liquid Crystal Technologies Co., LTD.), which is hereby incorporated herein by reference in its entirety. For such a VRLC stack, the additional cover glass 138 is required at the stack or assembly 136 (see FIGS. 5 and 6).

The VRLC glass assembly disclosed herein provides an integrated cover glass that is part of the stack of layers and thus eliminates the need for an additional glass layer or substrate. For example, and with reference to FIG. 7, a VRLC stack 236, having an integrated cover glass, has the cover glass disposed between the absorptive polarizer and the transparent electrode. Such a configuration eliminates the need for the additional glass layer or cover glass, but has the top polarizer layer exposed. The cover glass may comprise a rounded perimeter edge glass substrate and may comprise a planar glass substrate or a prismatic glass substrate (which has the front or first surface angled relative to the rear or second surface and may further reduce unwanted reflections at the front or first surface of the mirror reflective element), depending on the particular application of the mirror assembly. The liquid crystal mirror provides electrically variable reflectance, and may utilize aspects as the mirrors described in U.S. Pat. Nos. 10,166,926 and/or 9,493,122, and/or U.S. Publication Nos. US-2016-0009226 and/or US-2011-0273659, which are hereby incorporated herein by reference in their entireties.

Figure 8:
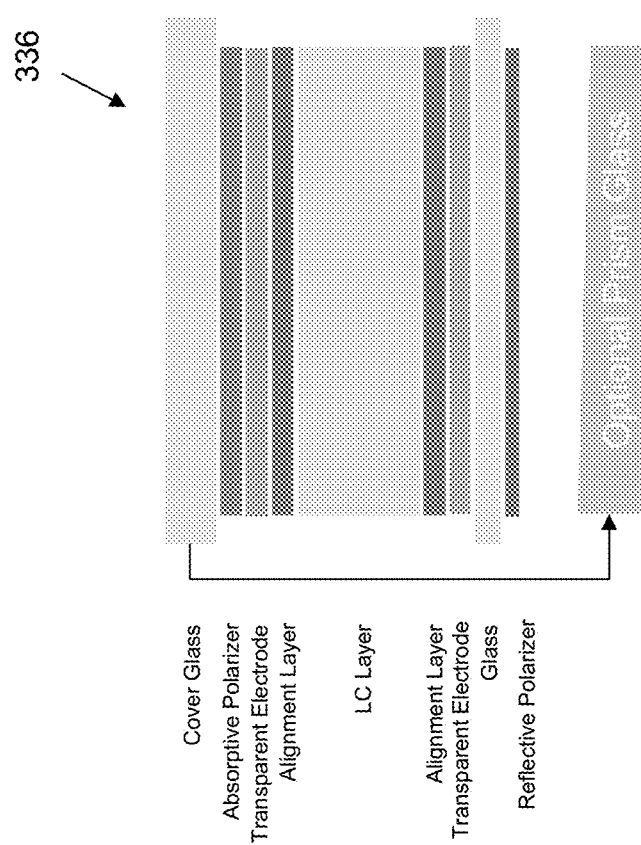
FIG. 8 is a schematic of another VRLC stack of layers for the liquid crystal glass assembly, with an integrated cover glass.

Optionally, and such as shown in FIG. 8, a VRLC stack 336 may have the cover glass disposed over the absorptive polarizer, so that the absorptive polarizer is disposed between the cover glass and the transparent electrode. With such a configuration, the cover glass is integrated into the assembly, thereby eliminating the need for a layer of additional glass, and the top polarizer layer is protected by the cover glass. As shown in FIG. 8, the absorptive polarizer is disposed between the cover glass and the transparent electrode. Optionally, the absorptive polarizer may be disposed between the transparent electrode and the alignment layer. Optionally, the absorptive polarizer may also function as the alignment layer. The cover glass may comprise a rounded perimeter edge glass substrate and may comprise a planar glass substrate or a prismatic glass substrate, depending on the particular application of the mirror assembly.

Figure 9:
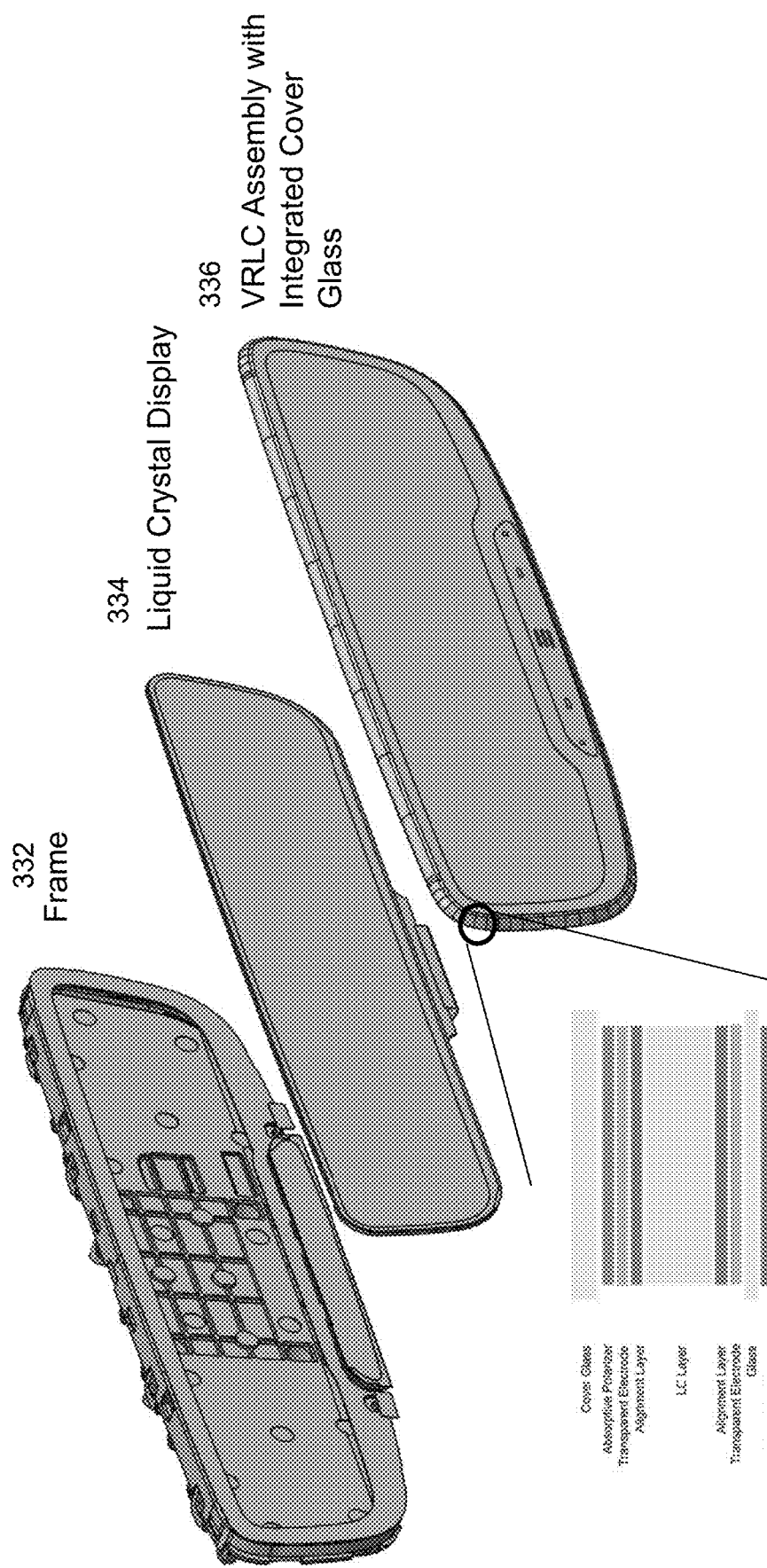
FIG. 9 is an exploded perspective view of a mirror reflective element and display assembly, with the mirror reflective element having the VRLC stack of layers of FIG. 8.

As shown in FIG. 9, with the VRLC assembly having the integrated cover glass (such as discussed above with reference to FIGS. 7 and 8, the mirror stack or assembly comprises the frame 332, liquid crystal display 334 and VRLC assembly 336 with integrated cover glass. The cover glass may comprise a rounded perimeter edge glass substrate and may comprise a planar glass substrate or a prismatic glass substrate, depending on the particular application of the mirror assembly.

Figure 12:
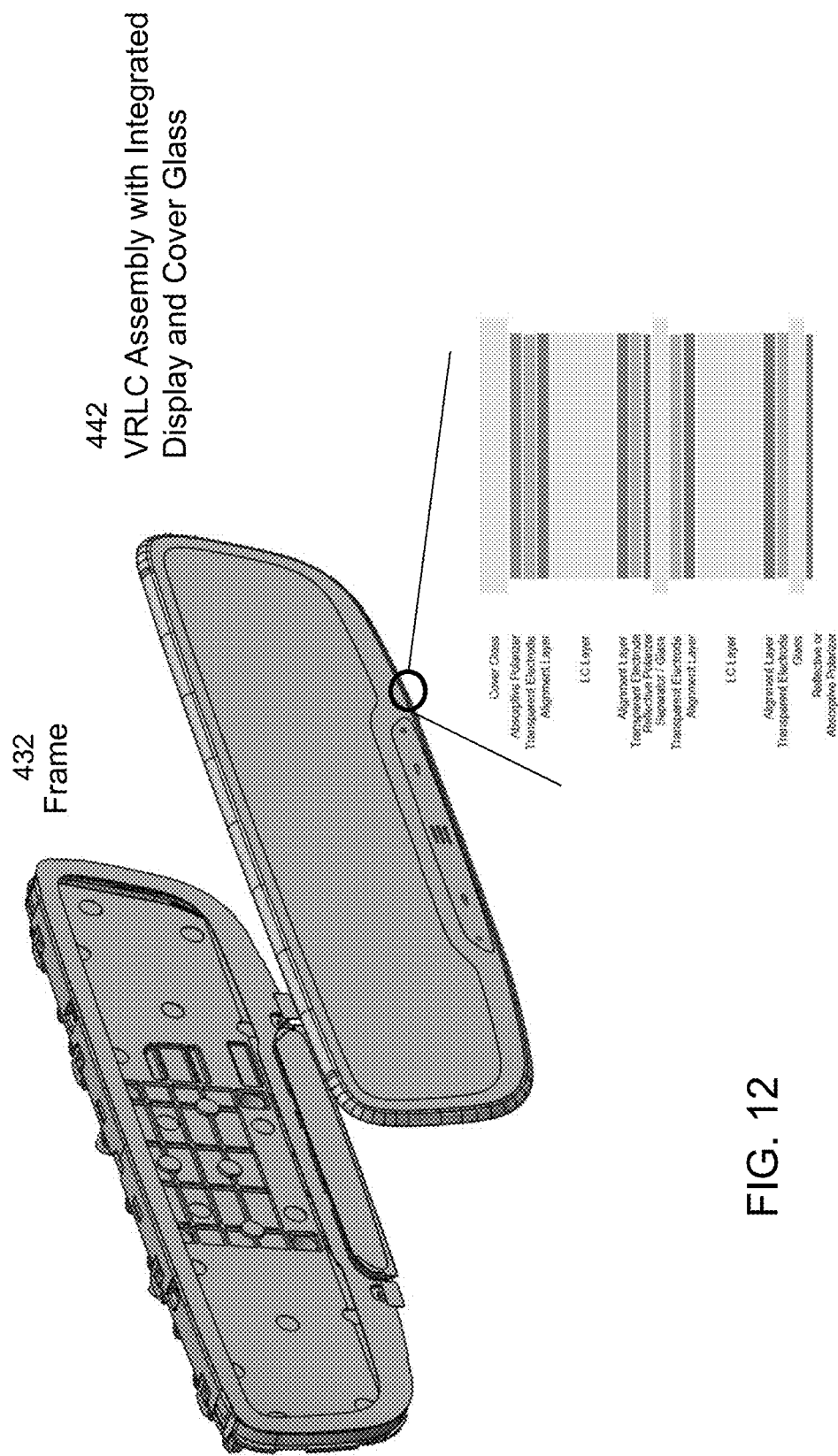
FIG. 12 is an exploded perspective view of a mirror reflective element and display assembly, with the mirror reflective element having the VRLC stack of layers of FIG. 10.

Optionally, the VRLC mirror assembly and the LCD video display screen may be combined into a single unit or VRLC assembly with integrated LC display and LC mirror and cover glass. For example, and such as shown in FIG. 10, the LCD display 340 and the VRLC assembly 336 may be combined, with the cover glass at the outer side of the combined stacks of layers. As shown in FIG. 11, when the VRLC assembly and display are combined, the cover glass is integrated onto the assembly. As can be seen in FIG. 11, the VRLC assembly 436 is similar to the VRLC assembly 336, discussed above, but with the rear glass substrate disposed between the reflective polarizer and a transparent electrode of the display screen 440. The center glass substrate thus functions as the rear glass substrate of the VRLC assembly 336 and as the front glass substrate of the display assembly 440. The VRLC assembly 442 thus combines the multiple stacks or assemblies into a single stack and eliminates components. Thus, and such as shown in FIG. 12, the mirror head may comprise a frame 432 and the VRLC assembly 442, which has the integrated or combined LC display and LC mirror (with integrated cover glass). The cover glass may comprise a rounded perimeter edge glass substrate and may comprise a planar glass substrate or a prismatic glass substrate, depending on the particular application of the mirror assembly.

Therefore, the vehicular interior rearview mirror assembly includes an auto-dimming mirror and a display screen disposed behind the auto-dimming mirror and viewable through the auto-dimming mirror when displaying video images. The auto-dimming mirror comprises a variable reflectant stack of layers that reduces or minimizes double images so that the video images can be viewed with the same mirror head orientation as the reflected images are viewed (i.e., the mirror head does not need to mechanically toggle or pivot between a mirror mode orientation and a display mode orientation). By arranging the stack of layers, duplicate layers and components may be eliminated. Optionally, the cover glass may comprise a prismatic glass first surface (angled relative to the rear surface) to further reduce unwanted reflections. The mirror assembly provides variable reflectivity with a video display behind a VRLC mirror with an integrated cover glass, and optionally with an integrated prismatic cover glass, with the polarizer disposed or applied between the LC layer and the cover glass.

The mirror assembly may operate as part of a vehicle vision system and/or driver or driving assist system and/or object detection system and/or alert system that operates to capture images exterior of the vehicle and that may process the captured image data to display images and to detect objects at or near the vehicle and in the predicted path of the vehicle, such as to assist a driver of the vehicle in maneuvering the vehicle in a forward or rearward direction. The vision system includes an image processor or image processing system that is operable to receive image data from one or more cameras and to provide an output to one or more display devices for displaying video images representative of the captured image data. For example, the vision system may provide a rearview display or a top down or bird's eye or surround view display or the like.

The vision system 12 includes a control or electronic control unit (ECU) 18 having electronic circuitry and associated software, with the electronic circuitry including a data processor or image processor that is operable to process image data captured by the cameras, whereby the ECU may detect or determine presence of objects or the like and/or the system may provide video images to a display device of the interior rearview mirror assembly 20 of the vehicle for viewing by the driver of the vehicle and/or to a display device 22 at the center console or stack of the vehicle (and optionally to CMS displays at or near the driver and passenger side A-pillars of the vehicle, such as described in U.S.

Publication Nos. US-2018-0134217 and/or US-2014-0285666, which are hereby incorporated herein by reference in their entireties). The data transfer or signal communication from the cameras to the ECU may comprise any suitable data or communication link, such as a vehicle network bus or CAN (Controller Area Network) bus or LIN (Local Interconnect Network) bus or I2C bus or the like of the equipped vehicle.

The ECU receives image data captured by each of the cameras and the image data is processed by the data processor or image processor of the ECU. The ECU is connected to the video display of the mirror assembly 20 via a single coaxial wire or cable for communicating with the display (such as to provide control signals or the like) and for providing video image signals to the display. The ECU may also be connected to the video display 22 of the center console via a single coaxial wire or cable for communicating with the display and for providing video image signals to the display. Thus, the ECU may provide video images to the center stack display or head unit 22 and/or to the video mirror display 20.

The connections between the cameras and the ECU and/or between the displays and the ECUs may be made via respective coaxial cables, which may provide power and control of the cameras (by the ECU) and which may provide image data from the cameras to the ECU, and which may provide video images from the ECU to the display devices. Each device (e.g., camera and display device) is thus connected to and communicates with the ECU via a single respective coaxial cable, thus reducing cable inputs to the video mirror display and the center stack display. The connections and communications may utilize aspects of the systems described in U.S. Pat. Nos. 10,264,219; 9,900,490 and/or 9,609,757, which are hereby incorporated herein by reference in their entireties.

The surround view display system may utilize aspects of the systems described in U.S. Pat. Nos. 9,446,713; 9,085,261 and/or 6,690,268, and/or U.S. Publication Nos. US-2021-0094473; US-2020-0017143; US-2019-0297233; US-2019-0347825; US-2019-0118860; US-2019-0064831; US-2019-0042864; US-2019-0039649; US-2019-0143895; US-2019-0016264; US-2018-0276839; US-2018-0276838; US-2018-0253608; US-2018-0215382; US-2017-0254873; US-2017-0217372; US-2017-0050672; US-2015-0217693; US-2014-0160276; US-2014-0085472 and/or US-2015-0002670, which are all hereby incorporated herein by reference in their entireties.

Optionally, the system may provide for dimming control of the mirror reflective element of the interior mirror and of the mirror reflective elements of the exterior mirrors via processing of image data captured by one or more of the cameras (such as by utilizing aspects of the vision systems described in U.S. Publication Nos. US-2019-0258131 and/or US-2019-0047475, which are hereby incorporated herein by reference in their entireties). For example, the system may utilize a rearward sensing sensor at the mirror or the rearward viewing camera (at the CHMSL region) to determine glare light rearward of the vehicle when the vehicle is not towing a trailer. However, when the vehicle is towing a trailer that obstructs the rear window view, the tall trailer blocks the glare or rear sensing sensor at the interior mirror and blocks the rear backup camera view and blocks the CMS CHMSL camera view. Thus, the presence of the trailer inhibits the ability for glare control for the exterior auto-dimming mirrors using the rearward sensing sensor and/or rearward viewing cameras of the vehicle. In such trailering situations, the system may utilize the CMS exterior side cameras for independently determining glare conditions for each respective exterior auto-dimming mirror. Thus, the exterior CMS Cameras and the rearward viewing trailer camera can be used to detect glare and determine the driver and passenger side auto-dimming mirror level of dimming independently.

The microcontroller receives an input from a light sensor, and may control the auto-dimming mirror driver and the LED backlighting responsive to a detected or determined ambient light level at the mirror assembly. The system may also control dimming of the exterior mirrors and control the display intensity of the respective display screens (e.g., at the respective A-pillars) responsive to processing of image data captured by the respective side CMS cameras. The system may also control the intensity of the interior mirror display responsive to processing of image data captured by one or both side CMS cameras or responsive to processing of image data captured by the rearward viewing CHMSL camera or responsive to processing of image data captured by the rear backup camera or responsive to processing of image data captured by the trailer camera. The data used for dimming control may be provided by one or more of the cameras (such as one or more of the CMS cameras) and/or may be provided via the CAN or LIN bus of the vehicle. Optionally, the system may operate to control the intensity of dash lights or other interior vehicle lighting and/or exterior vehicle lighting responsive to processing of image data captured by one or more of the CMS cameras (or surround vision cameras) of the vehicle. The data used for dimming control may be provided by one or more of the cameras (such as one or more of the CMS cameras) and/or may be provided via the CAN or LIN bus of the vehicle.

Thus, the display system of the present invention may provide intelligent dimming to control the display intensity using camera lux information, and may utilize floating pogo pins between the backlighting FPC and the mirror cell (such as by utilizing aspects of the mirror assemblies and electrical connectors described in U.S. Pat. Nos. 10,484,587; 10,466,563; 9,878,669 and/or 9,565,342, which are hereby incorporated herein by reference in their entireties). The video display screen may comprise a 9.6" custom TFT with failsafe/on-screen-display image (displays a symbol or icon). The mirror assembly includes a human machine interface (HMI) that provides selectable three different view adjustments.

The cameras may comprise any suitable imaging sensor or camera, such as a pixelated imaging array or the like, such as a CMOS imaging array sensor, a CCD sensor or other sensors or the like, such as a camera or sensor of the types disclosed in commonly assigned, U.S. Pat. Nos. 7,965,336; 5,550,677; 5,760,962; 6,097,023 and 5,796,094, which are hereby incorporated herein by reference in their entireties. Optionally, the cameras may comprise a stereo imaging camera or the like, such as by utilizing aspects of the imaging systems described in U.S. Pat. Nos. 6,396,397 and/or 5,796,094, which are hereby incorporated herein by reference in their entireties. Optionally, the cameras may comprise an infrared or near infrared light sensitive camera and may be suitable for capturing images in low lighting conditions, and/or the camera may include or be associated with an illumination source (such as an infrared or near-infrared light emitting illumination source that, when actuated to emit infrared or near-infrared light at the side of the vehicle, enhances the camera's performance but is not visible or discernible to the driver of the vehicle), such as by utilizing aspects of the cameras described in U.S. Pat. Nos.

7,965,336; 5,550,677; 5,760,962; 6,097,023 and 5,796,094, which are hereby incorporated herein by reference in their entireties.

The sideward and rearward viewing cameras may be incorporated at the exterior rearview mirror assembly or elsewhere at the vehicle, such as at a side portion of the vehicle, and having a sideward and rearward field of view. Optionally, the camera may have a wide angle field of view at the side of the vehicle and/or may have an adjustable field of view and/or may capture images for use in other vision systems, such as for use in a top-down view or bird's-eye view vision system of the vehicle or a surround view vision system at the vehicle, such as by utilizing aspects of the vision systems described in U.S. Pat. Nos. 9,126,525; 9,041,806; 9,900,522; 9,900,522; 10,071,687 and/or 9,762,880, and/or U.S. Publication Nos. US-2015-0022664 and/or US-2012-0162427, which are hereby incorporated herein by reference in their entireties.

The mirror assembly may include a camera or sensor or light of a driver monitoring system and/or head and face direction and position tracking system and/or eye tracking system and/or gesture recognition system. Such head and face direction and/or position tracking systems and/or eye tracking systems and/or gesture recognition systems may utilize aspects of the systems described in U.S. Pat. Nos. 10,065,574; 10,017,114; 9,405,120 and/or 7,914,187, and/or U.S. Publication Nos. US-2021-0323473; US-2021-0291739; US-2020-0202151; US-2020-0143560; US-2020-0320320; US-2018-0231976; US-2018-0222414; US-2017-0274906; US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or U.S. patent application Ser. No. 17/650,255, filed Feb. 8, 2022, which published on Aug. 11, 2022 as U.S. Patent Publication No. US-2022-0254132, Ser. No. 17/649,723, filed Feb. 2, 2022, which published on Aug. 4, 2022 as U.S. Patent Publication No. US-2022-0242438, Ser. No. 17/450,721, filed Oct. 13, 2021, now U.S. Pat. No. 11,518,401, and/or U.S. provisional application Ser. No. 63/201,894, filed May 18, 2021, and/or International Application No. PCT/US2022/072238, filed May 11, 2022, which published on Nov. 17, 2022 as International Publication No. WO 2022241423, and/or International Application No. PCT/US2022/070882, filed Mar. 1, 2022, which published on Sep. 8, 2022 as International Publication No. WO 20222187805, which are hereby incorporated herein by reference in their entireties.

Optionally, the driver monitoring system may be integrated with a camera monitoring system (CMS) of the vehicle. The integrated vehicle system incorporates multiple inputs, such as from the inward viewing or driver monitoring camera and from the forward or outward viewing camera, as well as from a rearward viewing camera and sideward viewing cameras of the CMS, to provide the driver with unique collision mitigation capabilities based on full vehicle environment and driver awareness state. The image processing and detections and determinations are performed locally within the interior rearview mirror assembly and/or the overhead console region, depending on available space and electrical connections for the particular vehicle application. The CMS cameras and system may utilize aspects of the systems described in U.S. Pat. No. 11,242,008 and/or U.S. Publication Nos. US-2021-0162926; US-2021-0155167; US-2018-0134217 and/or US-2014-0285666, and/or International Application No. PCT/US2022/070062, filed Jan. 6, 2022, which are all hereby incorporated herein by reference in their entireties.

The ECU may receive image data captured by a plurality of cameras of the vehicle, such as by a plurality of surround view system (SVS) cameras and a plurality of camera monitoring system (CMS) cameras and optionally one or more driver monitoring system (DMS) cameras. The ECU may comprise a central or single ECU that processes image data captured by the cameras for a plurality of driving assist functions and may provide display of different video images to a video display screen in the vehicle (such as at an interior rearview mirror assembly or at a central console or the like) for viewing by a driver of the vehicle. The system may utilize aspects of the systems described in U.S. Pat. Nos. 11,242,008; 10,442,360 and/or 10,046,706, and/or U.S. Publication Nos. US-2021-0155167 and/or US-2019-0118717, and/or International Application No. PCT/US2022/070062, filed Jan. 6, 2022, which are all hereby incorporated herein by reference in their entireties.

The DMS camera may be disposed behind and viewing through the reflective polarizer used for the VRLC mirror, taking advantage of the IR transmittance of the materials. The near-IR light emitter may also be disposed behind and transmitting through the reflective polarizer used for the VRLC mirror. The VRLC mirror provides enhanced near-IR transmissive properties that are advantageous with the in-mirror DMS camera and near-IR light emitter. The VRLC mirror may, for example, provide at least 70 percent and preferably at least 80 percent transmittance in the 940 nm band that is used for DMS, both in reflective and transparent states. For example, spectrometer testing of VRLC samples indicate 85% to 95% IR transmittance in the 940 nm band that is used for DMS, both in reflective and transparent states. This is advantageous for both behind-the-glass cameras and near-IR illumination sources.

The mirror assembly may comprise any suitable construction, such as, for example, a mirror assembly with the reflective element being nested in the mirror casing and with a bezel portion that circumscribes a perimeter region of the front surface of the reflective element, or with the mirror casing having a curved or beveled perimeter edge around the reflective element and with no overlap onto the front surface of the reflective element (such as by utilizing aspects of the mirror assemblies described in U.S. Pat. Nos. 7,184,190; 7,274,501; 7,255,451; 7,289,037; 7,360,932; 7,626,749; 8,049,640; 8,277,059 and/or 8,529,108, which are hereby incorporated herein by reference in their entireties) or such as a mirror assembly having a rear substrate of an electro-optic reflective element nested in the mirror casing, and with the front substrate having curved or beveled perimeter edges, or such as a mirror assembly having a prismatic reflective element that is disposed at an outer perimeter edge of the mirror casing and with the prismatic substrate having curved or beveled perimeter edges, such as described in U.S. Pat. Nos. 8,508,831; 8,730,553; 9,598,016 and/or 9,346,403, and/or U.S. Publication Nos. US-2014-0313563 and/or US-2015-0097955, which are hereby incorporated herein by reference in their entireties (and with electro-optic and prismatic mirrors of such construction are commercially available from the assignee of this application under the trade name INFINITY™ mirror).

The mirror assembly may include user inputs or actuatable switches or touch sensors or the like for user/driver control of one or more features of the mirror assembly and/or display system. The user inputs or touch sensors may comprise any suitable sensors or inputs, and may utilize aspects of the inputs and sensors described in U.S. Pat. Nos. 9,827,913; 9,598,016; 9,346,403; 8,508,831; 8,730,553; 7,224,324; 7,253,723; 7,255,451 and/or 8,154,418, which are hereby incorporated herein by reference in their entireties.

Optionally, the display may utilize aspects of the displays of the types disclosed in U.S. Pat. Nos. 9,264,672; 9,041,806; 7,855,755; 7,777,611; 7,626,749; 7,581,859; 7,446,924; 7,446,650; 7,370,983; 7,338,177; 7,274,501; 7,255,451; 7,195,381; 7,184,190; 6,690,268; 6,329,925; 5,668,663; 5,530,240 and/or 5,724,187, and/or in U.S. Publication No. US-2006-0050018, which are all hereby incorporated herein by reference in their entireties. The display may be viewable through the reflective element when the display is activated to display information. The display element may be any type of display element, such as a liquid crystal display (LCD) element, a vacuum fluorescent (VF) display element, a light emitting diode (LED) display element, such as an organic light emitting diode (OLED) or an inorganic light emitting diode, an electroluminescent (EL) display element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like.

Changes and modifications to the specifically described embodiments may be carried out without departing from the principles of the present invention, which is intended to be limited only by the scope of the appended claims as interpreted according to the principles of patent law.

The invention claimed is:

1. A vehicular interior rearview mirror assembly, the vehicular interior rearview mirror assembly comprising:
   a mirror head and a mounting structure;
   wherein the mounting structure includes a mounting base configured to attach the vehicular interior rearview mirror assembly at an interior portion of a vehicle equipped with the vehicular interior rearview mirror assembly;
   wherein the mirror head is pivotable relative to the mounting structure via at least one pivot joint;
   wherein the mirror head comprises a mirror and display assembly, and wherein the mirror and display assembly comprises a liquid crystal mirror reflective element and a liquid crystal display;
   wherein the liquid crystal mirror reflective element comprises a first variable reflectivity liquid crystal (VRLC) stack, and wherein the first VRLC stack comprises (i) a front glass substrate, (ii) a middle glass substrate and (iii) a first liquid crystal (LC) medium disposed between the front glass substrate and the middle glass substrate;
   wherein the liquid crystal display comprises a second variable reflectivity liquid crystal (VRLC) stack, and wherein the second VRLC stack comprises (i) the middle glass substrate, (ii) a rear glass substrate and (iii) a second liquid crystal (LC) medium disposed between the middle glass substrate and the rear glass substrate;
   wherein the front glass substrate has a first side and a second side separated from the first side by a thickness of the front glass substrate;
   wherein the middle glass substrate has a first side and a second side separated from the first side by a thickness of the middle glass substrate;
   wherein the second side of the front glass substrate faces the first LC medium and wherein the first side of the middle glass substrate faces the first LC medium;
   wherein the rear glass substrate has a first side and a second side separated from the first side by a thickness of the rear glass substrate;
   wherein the second side of the middle glass substrate faces the second LC medium and wherein the first side of the rear glass substrate faces the second LC medium;
   wherein, with the vehicular interior rearview mirror assembly mounted at the interior portion of the vehicle and with the mirror head adjusted to provide a rearward view to a driver of the vehicle, the front glass substrate is closer to the driver of the vehicle than the rear glass substrate;
   wherein, with the vehicular interior rearview mirror assembly mounted at the interior portion of the vehicle, the liquid crystal display is operable to display video images derived from video images provided by an ECU of the vehicle, and wherein the displayed video images are viewable by the driver of the vehicle through the liquid crystal mirror reflective element;
   wherein, with the vehicular interior rearview mirror assembly mounted at the interior portion of the vehicle, the vehicular interior rearview mirror assembly is operable in a mirror mode and is operable in a display mode;
   wherein, with the vehicular interior rearview mirror assembly mounted at the interior portion of the vehicle, and with the vehicular interior rearview mirror assembly operating in the mirror mode, the driver of the vehicle views reflections at the liquid crystal mirror reflective element to view rearward of the vehicle; and
   wherein, with the vehicular interior rearview mirror assembly mounted at the interior portion of the vehicle, and with the vehicular interior rearview mirror assembly operating in the display mode, the liquid crystal display is actuated to display video images provided by the ECU for viewing by the driver through the liquid crystal mirror reflective element.

2. The vehicular interior rearview mirror assembly of claim 1, wherein the mirror head is not pivoted when switching between the mirror mode and the display mode.

3. The vehicular interior rearview mirror assembly of claim 1, wherein the first VRLC stack comprises an alignment layer and a transparent electrode disposed between the first LC medium and the first side of the middle glass substrate.

4. The vehicular interior rearview mirror assembly of claim 1, wherein the first VRLC stack comprises an alignment layer, a transparent electrode and an absorptive polarizer disposed between the first LC medium and the second side of the front glass substrate.

5. The vehicular interior rearview mirror assembly of claim 4, wherein the liquid crystal display comprises an alignment layer and a transparent electrode disposed between the second LC medium and the second side of the middle glass substrate.

6. The vehicular interior rearview mirror assembly of claim 5, wherein the liquid crystal display comprises an alignment layer and a transparent electrode disposed between the second LC medium and the first side of the rear glass substrate.

7. The vehicular interior rearview mirror assembly of claim 6, wherein the mirror and display assembly comprises an absorptive polarizer at the second side of the rear glass substrate.

8. The vehicular interior rearview mirror assembly of claim 4, wherein a reflective polarizer is disposed between the middle glass substrate and the transparent electrode disposed between the first LC medium and the first side of the middle glass substrate.

9. The vehicular interior rearview mirror assembly of claim 1, comprising a driver monitoring camera disposed behind and viewing through a reflective polarizer of the liquid crystal mirror reflective element.

10. The vehicular interior rearview mirror assembly of claim 9, comprising a near-infrared light emitter disposed behind and emitting light that passes through the reflective polarizer of the liquid crystal mirror reflective element.

11. The vehicular interior rearview mirror assembly of claim 10, wherein the liquid crystal mirror reflective element provides at least 80 percent transmittance of near-infrared light in both a reflective state and a transparent state.

12. The vehicular interior rearview mirror assembly of claim 11, wherein the liquid crystal mirror reflective element provides 85 percent to 95 percent transmittance of near-infrared light in both the reflective state and the transparent state.

13. The vehicular interior rearview mirror assembly of claim 1, wherein the mirror and display assembly is attached at a frame portion of the mirror head.

14. A vehicular interior rearview mirror assembly, the vehicular interior rearview mirror assembly comprising:
   a mirror head and a mounting structure;
   wherein the mounting structure includes a mounting base configured to attach the vehicular interior rearview mirror assembly at an interior portion of a vehicle equipped with the vehicular interior rearview mirror assembly;
   wherein the mirror head is pivotable relative to the mounting structure via at least one pivot joint;
   wherein the mirror head comprises a mirror and display assembly, and wherein the mirror and display assembly comprises a liquid crystal mirror reflective element and a liquid crystal display;
   wherein the liquid crystal mirror reflective element comprises a first variable reflectivity liquid crystal (VRLC) stack, and wherein the first VRLC stack comprises (i) a front glass substrate, (ii) a middle glass substrate, (iii) a first liquid crystal (LC) medium disposed between the front glass substrate and the middle glass substrate and (iv) a reflective polarizer;
   wherein the liquid crystal display comprises a second variable reflectivity liquid crystal (VRLC) stack, and wherein the second VRLC stack comprises (i) the middle glass substrate, (ii) a rear glass substrate and (iii) a second liquid crystal (LC) medium disposed between the middle glass substrate and the rear glass substrate;
   a driver monitoring camera disposed behind and viewing through the reflective polarizer of the liquid crystal mirror reflective element;
   wherein the front glass substrate has a first side and a second side separated from the first side by a thickness of the front glass substrate;
   wherein the middle glass substrate has a first side and a second side separated from the first side by a thickness of the middle glass substrate;
   wherein the second side of the front glass substrate faces the first LC medium and wherein the first side of the middle glass substrate faces the first LC medium;
   wherein the rear glass substrate has a first side and a second side separated from the first side by a thickness of the rear glass substrate;
   wherein the second side of the middle glass substrate faces the second LC medium and wherein the first side of the rear glass substrate faces the second LC medium;
   wherein, with the vehicular interior rearview mirror assembly mounted at the interior portion of the vehicle and with the mirror head adjusted to provide a rearward view to a driver of the vehicle, the front glass substrate is closer to the driver of the vehicle than the rear glass substrate;
   wherein, with the vehicular interior rearview mirror assembly mounted at the interior portion of the vehicle, the liquid crystal display is operable to display video images derived from video images provided by an ECU of the vehicle, and wherein the displayed video images are viewable by the driver of the vehicle through the liquid crystal mirror reflective element;
   wherein, with the vehicular interior rearview mirror assembly mounted at the interior portion of the vehicle, the vehicular interior rearview mirror assembly is operable in a mirror mode and is operable in a display mode;
   wherein the mirror head is not pivoted when switching between the mirror mode and the display mode;
   wherein, with the vehicular interior rearview mirror assembly mounted at the interior portion of the vehicle, and with the vehicular interior rearview mirror assembly operating in the mirror mode, the driver of the vehicle views reflections at the liquid crystal mirror reflective element to view rearward of the vehicle; and
   wherein, with the vehicular interior rearview mirror assembly mounted at the interior portion of the vehicle, and with the vehicular interior rearview mirror assembly operating in the display mode, the liquid crystal display is actuated to display video images provided by the ECU for viewing by the driver through the liquid crystal mirror reflective element.

15. The vehicular interior rearview mirror assembly of claim 14, wherein the first VRLC stack comprises an alignment layer, a transparent electrode and an absorptive polarizer disposed between the first LC medium and the second side of the front glass substrate, and wherein the liquid crystal display comprises an alignment layer and a transparent electrode disposed between the second LC medium and the second side of the middle glass substrate.

16. The vehicular interior rearview mirror assembly of claim 15, wherein the liquid crystal display comprises an alignment layer and a transparent electrode disposed between the second LC medium and the first side of the rear glass substrate.

17. The vehicular interior rearview mirror assembly of claim 16, wherein the mirror and display assembly comprises an absorptive polarizer at the second side of the rear glass substrate.

18. The vehicular interior rearview mirror assembly of claim 14, comprising a near-infrared light emitter disposed behind and emitting light that passes through the reflective polarizer of the liquid crystal mirror reflective element.

19. A vehicular interior rearview mirror assembly, the vehicular interior rearview mirror assembly comprising:
   a mirror head and a mounting structure;
   wherein the mounting structure includes a mounting base configured to attach the vehicular interior rearview mirror assembly at an interior portion of a vehicle equipped with the vehicular interior rearview mirror assembly;

wherein the mirror head is pivotable relative to the mounting structure via at least one pivot joint;

wherein the mirror head comprises a mirror and display assembly, and wherein the mirror and display assembly comprises a liquid crystal mirror reflective element and a liquid crystal display;

wherein the liquid crystal mirror reflective element comprises a first variable reflectivity liquid crystal (VRLC) stack, and wherein the first VRLC stack comprises (i) a front glass substrate, (ii) a middle glass substrate and (iii) a first liquid crystal (LC) medium disposed between the front glass substrate and the middle glass substrate;

wherein the liquid crystal display comprises a second variable reflectivity liquid crystal (VRLC) stack, and wherein the second VRLC stack comprises (i) the middle glass substrate, (ii) a rear glass substrate and (iii) a second liquid crystal (LC) medium disposed between the middle glass substrate and the rear glass substrate;

wherein the front glass substrate has a first side and a second side separated from the first side by a thickness of the front glass substrate;

wherein the middle glass substrate has a first side and a second side separated from the first side by a thickness of the middle glass substrate;

wherein the second side of the front glass substrate faces the first LC medium and wherein the first side of the middle glass substrate faces the first LC medium;

wherein the rear glass substrate has a first side and a second side separated from the first side by a thickness of the rear glass substrate;

wherein the second side of the middle glass substrate faces the second LC medium and wherein the first side of the rear glass substrate faces the second LC medium;

wherein the first VRLC stack comprises an alignment layer, a transparent electrode and an absorptive polarizer disposed between the first LC medium and the second side of the front glass substrate;

wherein the liquid crystal display comprises an alignment layer and a transparent electrode disposed between the second LC medium and the second side of the middle glass substrate, and wherein the liquid crystal display comprises an alignment layer and a transparent electrode disposed between the second LC medium and the first side of the rear glass substrate;

wherein the mirror and display assembly comprises an absorptive polarizer at the second side of the rear glass substrate;

wherein a reflective polarizer is disposed between the middle glass substrate and the transparent electrode disposed between the first LC medium and the first side of the middle glass substrate wherein, with the vehicular interior rearview mirror assembly mounted at the interior portion of the vehicle and with the mirror head adjusted to provide a rearward view to a driver of the vehicle, the front glass substrate is closer to the driver of the vehicle than the rear glass substrate;

wherein, with the vehicular interior rearview mirror assembly mounted at the interior portion of the vehicle, the liquid crystal display is operable to display video images derived from video images provided by an ECU of the vehicle, and wherein the displayed video images are viewable by the driver of the vehicle through the liquid crystal mirror reflective element;

wherein, with the vehicular interior rearview mirror assembly mounted at the interior portion of the vehicle, the vehicular interior rearview mirror assembly is operable in a mirror mode and is operable in a display mode;

wherein the mirror head is not pivoted when switching between the mirror mode and the display mode;

wherein, with the vehicular interior rearview mirror assembly mounted at the interior portion of the vehicle, and with the vehicular interior rearview mirror assembly operating in the mirror mode, the driver of the vehicle views reflections at the liquid crystal mirror reflective element to view rearward of the vehicle; and wherein, with the vehicular interior rearview mirror assembly mounted at the interior portion of the vehicle, and with the vehicular interior rearview mirror assembly operating in the display mode, the liquid crystal display is actuated to display video images provided by the ECU for viewing by the driver through the liquid crystal mirror reflective element.

20. The vehicular interior rearview mirror assembly of claim 19, comprising a driver monitoring camera disposed behind and viewing through a reflective polarizer of the liquid crystal mirror reflective element.

21. The vehicular interior rearview mirror assembly of claim 20, comprising a near-infrared light emitter disposed behind and emitting light that passes through the reflective polarizer of the liquid crystal mirror reflective element.

* * * * *

UNITED STATES PATENT AND TRADEMARK OFFICE
CERTIFICATE OF CORRECTION

| | | |
|---|---|---|
| PATENT NO. | : 11,766,968 B2 | Page 1 of 1 |
| APPLICATION NO. | : 17/663437 | |
| DATED | : September 26, 2023 | |
| INVENTOR(S) | : Kenneth C. Peterson et al. | |

It is certified that error appears in the above-identified patent and that said Letters Patent is hereby corrected as shown below:

In the Specification

<u>Column 3</u>
Line 17, "WO 2022/050826," should be --WO 2022/150826--

<u>Column 9</u>
Line 48, "Sep. 8, 2022" should be --Sep. 9, 2022--
Lines 48-49, "WO 20222187805" should be --WO 2022187805--

Signed and Sealed this
Twenty-fourth Day of October, 2023

Katherine Kelly Vidal
*Director of the United States Patent and Trademark Office*